(No Model.) 4 Sheets—Sheet 1.
W. A. DAWSON.
RUNNING GEAR FOR VEHICLES.

No. 292,900. Patented Feb. 5, 1884.

Witnesses,
Geo. H. Strong.
J. H. Rouse

Inventor,
Wm. A. Dawson
By Dewey & Co.
Attorney (No Model.) 4 Sheets—Sheet 2.
W. A. DAWSON.
RUNNING GEAR FOR VEHICLES.
No. 292,900. Patented Feb. 5, 1884.
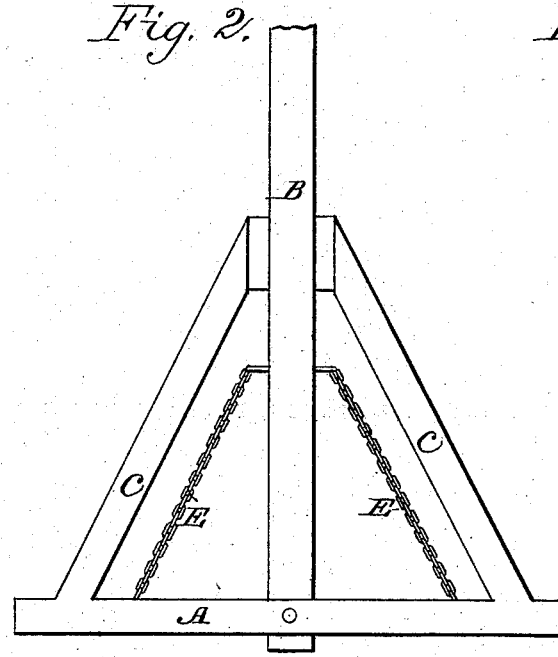
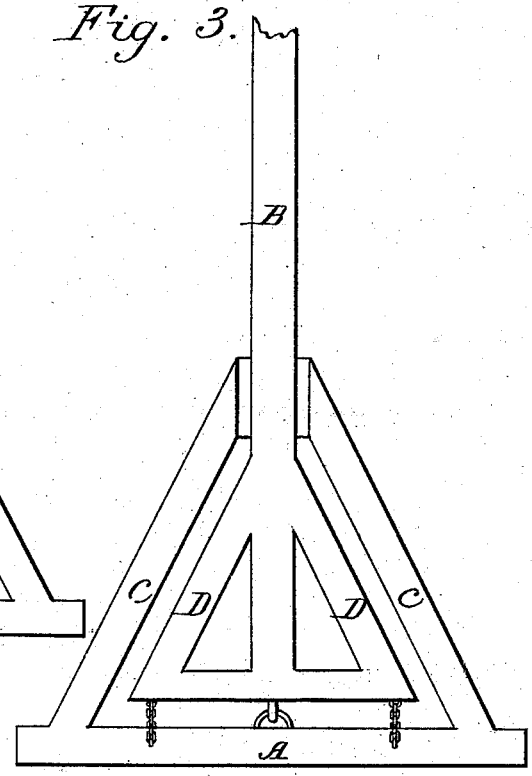
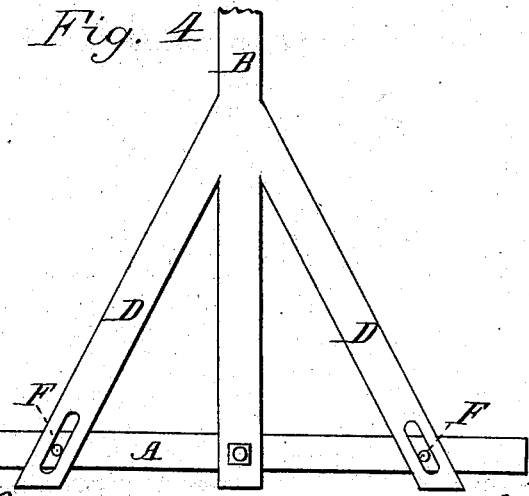
Witnesses,
Geo. H. Strong.
J. H. Rouse.
Inventor,
Wm. A. Dawson
By Dewey & Co.
Attorneys (No Model.) 4 Sheets—Sheet 3.
W. A. DAWSON.
RUNNING GEAR FOR VEHICLES.
No. 292,900. Patented Feb. 5, 1884.
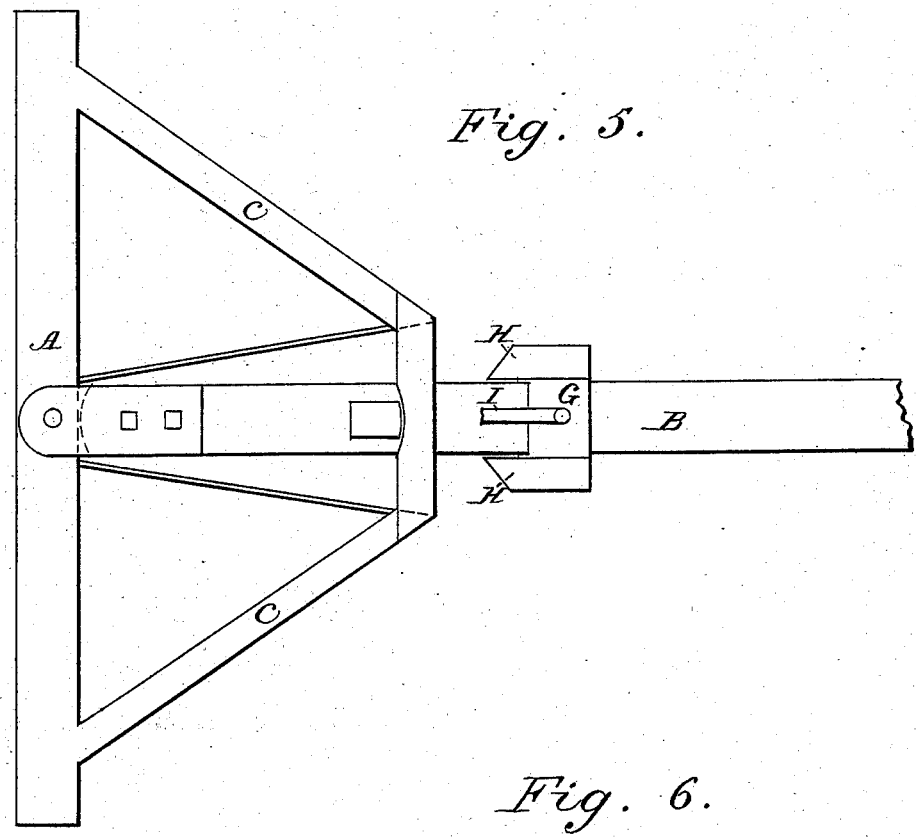
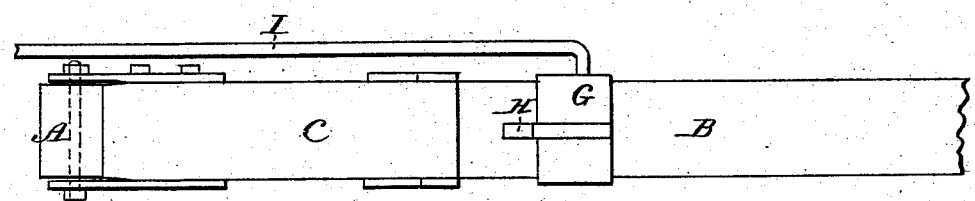
Witnesses:
Geo. H. Strong.
J. H. Krouse
Inventor,
Wm. A. Dawson
Dewey & Co.
Attorneys (No Model.) 4 Sheets—Sheet 4.

W. A. DAWSON.
RUNNING GEAR FOR VEHICLES.

No. 292,900. Patented Feb. 5, 1884.

Attest;
T. Walter Fowler,
H. B. Applewhaite

Inventor;
Wm. A. Dawson
pr Dewey & Co
Attorneys

UNITED STATES PATENT OFFICE.

WILLIAM A. DAWSON, OF STONY POINT, CALIFORNIA, ASSIGNOR OF ONE-FOURTH TO E. K. EVANS, OF SAME PLACE.

RUNNING-GEAR FOR VEHICLES.

SPECIFICATION forming part of Letters Patent No. 292,900, dated February 5, 1884.

Application filed May 3, 1883. (No model.)

*To all whom it may concern:*

Be it known that I, WILLIAM A. DAWSON, of Stony Point, county of Sonoma, State of California, have invented an Improvement in Vehicles; and I hereby declare the following to be a full, clear, and exact description thereof.

My invention relates to certain improvements in vehicles; and it consists in a novel construction and attachment of the pole to the forward axle or gearing, so as to relieve the draft-animals from the violent shocks and blows of the pole, caused by the irregular and unequal stoppage of the front wheels upon rough roads.

Figure 1:
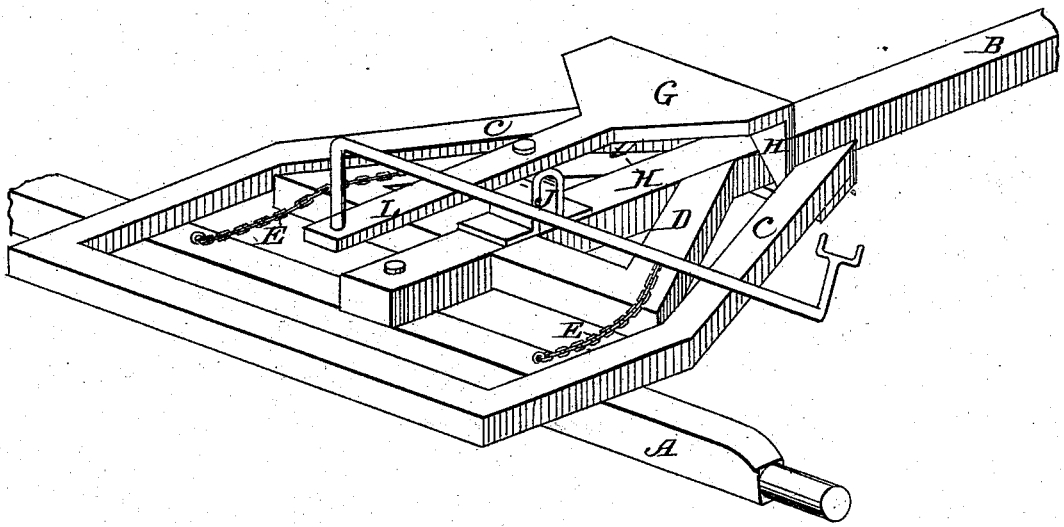
Figure 7:
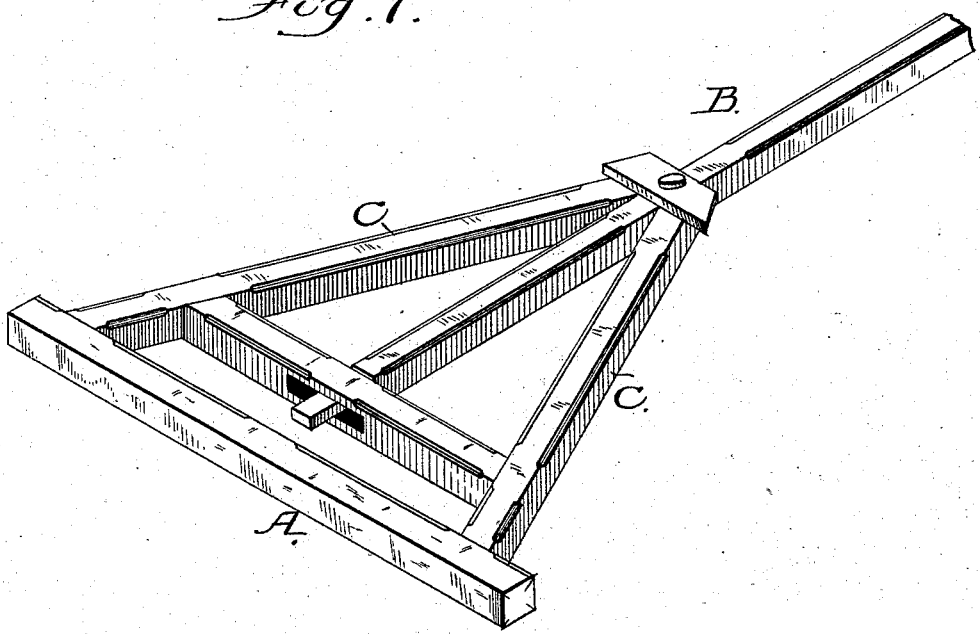

Referring to the accompanying drawings for a more complete explanation of my invention, Figure 1 is a view of a portion of a vehicle-axle, a pole, hounds, and the attachment to a vehicle, showing one form of my device. Figs. 2, 3, 4, 5, 6, and 7 are modifications of my invention.

In the ordinary construction of vehicles, the pole is rigidly attached to the axle, and shares with it all shocks due to the unequal stoppages of the wheels upon rough roads, which cause the pole to be thrown violently from side to side. This annoys and sometimes injures the horses and interferes with their work.

In my invention, A is the front axle, and B is the pole, of a vehicle. In Fig. 1 I have shown the tongue or pole loosely attached to the front axle and extending forward between or above the front axle-hounds, C. The tongue-hounds D are loosely connected with the axle by means of chains or elastic connections E, which allow the front end of the pole a certain amount of lateral motion independent of the movements of the axle. By this construction it will be seen that if one of the front wheels strikes an obstruction, which temporarily checks it and causes the axle to be wrenched to one side, this side movement will not be instantly transmitted to the pole on account of this loose connection; but the axle will bring up gradually and the pole will receive but little or no motion from it. The pole may be made of one, two, or more pieces jointed, and either stationary or movable.

In some cases the axle-hounds may be made with a certain space between their front ends, the axle being pivoted at its rear ends, and elastic buffers may be inserted between the ends of the hounds and the sides of the pole; or chains or elastic connections may reach from the axle to the pole parallel with the hounds, as in Fig. 2.

The pole may or may not have hounds arranged on it. The pole and hounds may be so arranged as to have all the draft come from the king-bolt or center of the axle, or to pull evenly from any point of the front axle without impairing the lateral movement of the pole.

In Fig. 4 I have shown the tongue pivoted at its rear end to the axle, and having the hounds D extending over the axle and slotted, so that bolts F may pass through the slots into the axle upon each side of the place where the tongue is pivoted. The length of these slots determines the amount of movement the tongue has about the pivot. In some cases it may be found advisable to have long slots, so as to relieve the shock of the movements of the axle by rubber buffers inserted in the slots. Other devices may be used for the same purpose, the object being to allow the axle a certain amount of side motion without acting upon the tongue, and to relieve the latter from the shock of sudden side movements of the axle.

When it is necessary to hold the axle fixed in its central position, it may be done by means of a plate or other suitable device, G, having inclined lugs H projecting downward from it, so as to pass between the tongue and the hounds near their front, where the space is narrow. The hounds may be either stationary or movable and of any desired size or shape.

An arm, L, extends back from the plate G, and is bent, so as to form a lever with a suitable fulcrum, as shown at J. The end of this lever is within easy reach of the driver, and by placing his foot upon it the inclined lugs H may be forced between the tongue and hounds, so as to reduce the independent side motion to any desired degree, or altogether, when the tongue and axle will be fixed and act together rigidly. By releasing the device and withdrawing the lugs, the space is increased and the tongue allowed a more independent motion.

It will be manifest that the tongue might be pivoted at the forward ends of the hounds and its rear end allowed a movement in the arc of a circle, with suitable rigid or elastic checks, as before described.

Having thus described my invention, what I claim as new, and desire to secure by Letters Patent, is—

1. In a vehicle having a front and rear axle, the tongue B, loosely pivoted to the front axle, A, in combination with the hounds C and D and chains E, all constructed to operate substantially as and for the purpose set forth.

2. In a vehicle having a front and rear axle, the tongue B, loosely pivoted to the front axle, A, in combination with hounds C and D, chains E, plate G, provided with the lugs H, and lever-arm I, all constructed to operate as and for the purpose set forth.

In witness whereof I hereunto set my hand.

WILLIAM A. DAWSON.

Witnesses:
S. H. NOURSE,
G. W. EMERSON.